United States Patent
Yum et al.

(10) Patent No.: US 10,404,348 B2
(45) Date of Patent: Sep. 3, 2019

(54) METHOD FOR REPORTING CHANNEL STATE AND APPARATUS THEREFOR

(71) Applicant: LG ELECTRONICS INC., Seoul (KR)

(72) Inventors: Kunil Yum, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/556,966

(22) PCT Filed: Apr. 8, 2016

(86) PCT No.: PCT/KR2016/003729
§ 371 (c)(1),
(2) Date: Sep. 8, 2017

(87) PCT Pub. No.: WO2016/163819
PCT Pub. Date: Oct. 13, 2016

(65) Prior Publication Data
US 2018/0069612 A1    Mar. 8, 2018

Related U.S. Application Data

(60) Provisional application No. 62/144,905, filed on Apr. 8, 2015.

(51) Int. Cl.
*H04B 7/06* (2006.01)
*H04L 1/00* (2006.01)
(Continued)

(52) U.S. Cl.
CPC .......... *H04B 7/0632* (2013.01); *H04B 7/066* (2013.01); *H04L 1/00* (2013.01); *H04L 1/0026* (2013.01);
(Continued)

(58) Field of Classification Search
CPC .... H04B 7/0632; H04B 7/066; H04B 7/0417; H04B 7/0619; H04B 7/0636;
(Continued)

(56) References Cited

U.S. PATENT DOCUMENTS 8,588,323 B2 * 11/2013 Allpress ............... H04B 7/0413
375/260
8,797,889 B2 * 8/2014 Parkvall ............... H04W 24/10
370/248
(Continued)

FOREIGN PATENT DOCUMENTS

CN        102468929 B      10/2014
KR    10-2010-0059931 A    6/2010
(Continued)

OTHER PUBLICATIONS

Motorola, "PDCCH Performance vs non-precoded WB CQI update rate," 3GPP TSG RAN1 #52, R1-080735, Sorrento, Italy, Feb. 11-15, 2008, 4 pages.

*Primary Examiner* — Warner Wong
(74) *Attorney, Agent, or Firm* — Birch, Stewart, Kolasch & Birch, LLP

(57) ABSTRACT

The present invention relates to a method for reporting a channel state in a wireless communication system according to one embodiment of the present invention, wherein a terminal can retune between a plurality of narrowbands and receive data, and the method may comprise the steps of: receiving a configuration for reporting a channel state; calculating a channel quality indicator for all the plurality of narrowbands if a periodical broadband feedback mode is configured according to the configuration for reporting a channel state; and reporting the calculated channel quality indicator.

8 Claims, 9 Drawing Sheets

(51) Int. Cl.
- *H04L 5/00* (2006.01)
- *H04L 27/00* (2006.01)
- *H04W 24/10* (2009.01)
- *H04W 72/04* (2009.01)
- *H04B 1/713* (2011.01)
- *H04L 27/20* (2006.01)
- *H04L 27/36* (2006.01)

(52) U.S. Cl.
CPC .......... H04L 1/0027 (2013.01); H04L 5/0048 (2013.01); H04L 5/0057 (2013.01); H04L 5/0091 (2013.01); H04L 27/0008 (2013.01); *H04B 1/713* (2013.01); *H04L 5/001* (2013.01); *H04L 5/0023* (2013.01); *H04L 5/0035* (2013.01); *H04L 27/2042* (2013.01); *H04L 27/362* (2013.01); *H04W 24/10* (2013.01); *H04W 72/0413* (2013.01)

(58) Field of Classification Search
CPC ..... H04L 1/0026; H04L 5/0057; H04L 43/00; H04L 43/06; H04L 29/06523; H04W 24/10

See application file for complete search history.

(56) References Cited

U.S. PATENT DOCUMENTS

| | | | |
|---|---|---|---|
| 9,749,892 B2* | 8/2017 | Davydov | H04L 5/0053 |
| 9,838,103 B2* | 12/2017 | Lee | H04W 24/00 |
| 2006/0203794 A1 | 9/2006 | Sampath et al. | |
| 2007/0098093 A1* | 5/2007 | Kwon | H04B 7/0689 375/260 |
| 2007/0191065 A1 | 8/2007 | Lee et al. | |
| 2009/0116570 A1* | 5/2009 | Bala | H04L 1/0026 375/260 |
| 2010/0034093 A1* | 2/2010 | Roh | H04B 7/0417 370/241 |
| 2010/0041344 A1* | 2/2010 | Kim | H04L 1/0026 455/69 |
| 2010/0118817 A1* | 5/2010 | Damnjanovic | H04L 1/0026 370/329 |
| 2011/0009139 A1* | 1/2011 | Nagata | H04W 24/10 455/509 |
| 2011/0021230 A1* | 1/2011 | Moberg | H04L 1/0027 455/507 |
| 2011/0096690 A1* | 4/2011 | Hoshino | H04L 1/0026 370/252 |
| 2011/0142144 A1* | 6/2011 | Allpress | H04B 7/0413 375/259 |
| 2011/0250848 A1* | 10/2011 | Bergljung | H04B 7/0417 455/67.11 |
| 2012/0039252 A1* | 2/2012 | Damnjanovic | H04L 1/0026 370/328 |
| 2012/0044894 A1* | 2/2012 | Ko | H04L 1/0026 370/329 |
| 2012/0051248 A1* | 3/2012 | Roh | H04B 7/0417 370/252 |
| 2012/0087435 A1* | 4/2012 | Gomadam | H04B 7/0452 375/285 |
| 2012/0106661 A1* | 5/2012 | Jiang | H04B 7/0617 375/259 |
| 2012/0120838 A1* | 5/2012 | Farajidana | H04B 7/024 370/252 |
| 2013/0003788 A1* | 1/2013 | Marinier | H04B 7/024 375/219 |
| 2013/0039197 A1* | 2/2013 | Pan | H04L 1/0026 370/252 |
| 2013/0051382 A1 | 2/2013 | Derham | |
| 2013/0094464 A1* | 4/2013 | Li | H04W 72/0413 370/329 |
| 2013/0114655 A1* | 5/2013 | Gomadam | H04B 7/0456 375/219 |
| 2013/0155973 A1* | 6/2013 | Geirhofer | H04W 72/1231 370/329 |
| 2013/0286884 A1* | 10/2013 | Li | H04L 1/0026 370/252 |
| 2014/0301232 A1* | 10/2014 | Rao | H04W 24/02 370/252 |
| 2015/0049692 A1* | 2/2015 | Ding | H04L 5/0023 370/329 |
| 2015/0049702 A1* | 2/2015 | Cheng | H04B 7/024 370/329 |
| 2015/0117249 A1* | 4/2015 | Zhou | H04L 1/0026 370/252 |
| 2015/0139016 A1* | 5/2015 | Ma | H04L 5/0007 370/252 |
| 2015/0155999 A1* | 6/2015 | Gao | H04L 1/0026 370/252 |
| 2015/0172033 A1* | 6/2015 | Clerckx | H04W 24/10 370/329 |
| 2015/0215928 A1* | 7/2015 | Davydov | H04L 5/0053 370/329 |
| 2015/0381254 A1* | 12/2015 | Liang | H04B 7/024 370/329 |
| 2016/0065276 A1* | 3/2016 | Zhang | H04L 1/0028 375/267 |
| 2016/0127936 A1* | 5/2016 | Chatterjee | H04B 7/0626 370/252 |
| 2016/0269089 A1* | 9/2016 | Liu | H04B 7/0626 |
| 2016/0269149 A1* | 9/2016 | Pan | H04L 1/1861 |
| 2017/0250781 A1* | 8/2017 | Golitschek Edler Von Elbwart | H04L 5/005 |

FOREIGN PATENT DOCUMENTS

| | | |
|---|---|---|
| KR | 10-1282522 B1 | 7/2013 |
| WO | WO 2013/049768 A1 | 4/2013 |
| WO | 2013/105811 A1 | 7/2013 |
| WO | WO 2014/111694 A1 | 7/2014 |

* cited by examiner

METHOD FOR REPORTING CHANNEL STATE AND APPARATUS THEREFOR

CROSS REFERENCE TO RELATED APPLICATIONS:

This application is the National Phase of PCT/KR2016/003729 filed on Apr. 8, 2016, which claims priority under 35 U.S.C. § 119(e) to U.S. Provisional Application No. 62/144,905 filed on Apr. 8, 2015, all of which are hereby expressly incorporated by reference into the present application.

TECHNICAL FIELD

The present disclosure relates to a wireless communication system, and more particularly, to a method and apparatus for reporting a channel state.

BACKGROUND ART

Various techniques including Machine-to-Machine (M2M) communication and various devices requiring a high data rate, e.g., smartphones and tablet Personal Computers (PCs), have emerged and gained popularity. As a consequence, the amount of data to be processed in a cellular network is rapidly increasing. To satisfy such rapidly increasing data processing requirements, Carrier Aggregation (CA), cognitive radio, etc. for efficiently using a larger number of frequency bands, Multiple Input Multiple Output (MIMO), Coordinated Multipoint transmission and reception (CoMP), etc. for increasing the amount of data transmitted in limited frequency bands have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicates with a UE using the same time-frequency resources offers a higher throughput than a conventional communication scheme in which each node operates as an independent base station (BS) and communicates with a UE without cooperation with other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated at a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as a MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may be satisfactorily performed with uniform quality irrespective of the locations of UEs within a cell. Furthermore, the multi-node system boasts reduced signal loss during transmission because BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE

Technical Problem

The present disclosure is intended to propose a method for reporting a channel state.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an embodiment of the present disclosure, a method for reporting a channel state in a wireless communication system, performed by a terminal for receiving data, while retuning between a plurality of narrowbands, includes receiving, by the terminal, a configuration for channel state reporting, calculating, by the terminal, a channel quality indicator (CQI) for all of the plurality of narrowbands when the configuration indicates that a periodic wideband feedback mode is configured for the terminal, and reporting, by the terminal, the calculated CQI.

Additionally or alternatively, the calculating a CQI may include performing channel measurement in a reference resource configured for channel state reporting in each of the plurality of narrowbands.

Additionally or alternatively, the method may further include uniformly using a result of the channel measurement performed in each of the plurality of narrowbands to calculate the CQI.

Additionally or alternatively, the method may comprise using a result of the channel measurement performed in each of the plurality of narrowbands by applying different weights to the results of channel measurement to calculate the CQI.

Additionally or alternatively, the periodic wideband feedback mode may be Mode 1-0 or Mode 1-1.

Additionally or alternatively, the method may further include, when a periodic subband feedback mode is configured according to the configuration for channel state reporting, reporting a best CQI from among CQIs of the plurality of narrowbands, and a size of the plurality of narrowbands may be fixed irrespective of a system bandwidth.

Additionally or alternatively, the method may further include, when a periodic subband feedback mode is configured according to the configuration for channel state reporting, reporting a CQI for a narrowband group including two or more narrowbands, and the narrowband group may be predefined or indicated by higher-layer signaling.

Additionally or alternatively, when at least part of the narrowband group is not included in the plurality of narrowbands, a CQI report for a narrowband of the narrowband group, not included in the plurality of narrowbands may be ignored.

Additionally or alternatively, the CQI for all of the plurality of narrowbands may be calculated using a cell-specific reference signal (CRS).

Additionally or alternatively, the method may further include receiving a channel state information-reference signal (CSI-RS) configuration for the channel state reporting, the CSI-RS configuration may be for all of the plurality of narrowbands, and a CSI-RS transmission period may be set to an integer multiple of a retuning period between the plurality of narrowbands.

In another embodiment of the present disclosure, a terminal for reporting a channel state in a wireless communication system, the terminal receiving data, while retuning between a plurality of narrowbands, includes a radio frequency (RF) unit, and a processor configured to control the RF unit. The processor may be configured to receive a configuration for channel state reporting, calculate a channel quality indicator (CQI) for all of the plurality of narrowbands when the configuration indicates that a periodic wideband feedback mode is configured for the terminal, and report the calculated CQI.

The above-described aspects of the present disclosure are merely a part of preferred embodiments of the present disclosure, and those skilled in the art will derive and understand various embodiments reflecting technical features of the present disclosure from a detailed description of the present disclosure as set forth below.

Advantageous Effects

According to an embodiment of the present disclosure, a rank-constrained UE may transmit a channel-related feedback, and an unnecessary transmission instance may be used for another channel-related feedback, thereby enabling efficient channel-related feedback and resource use.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
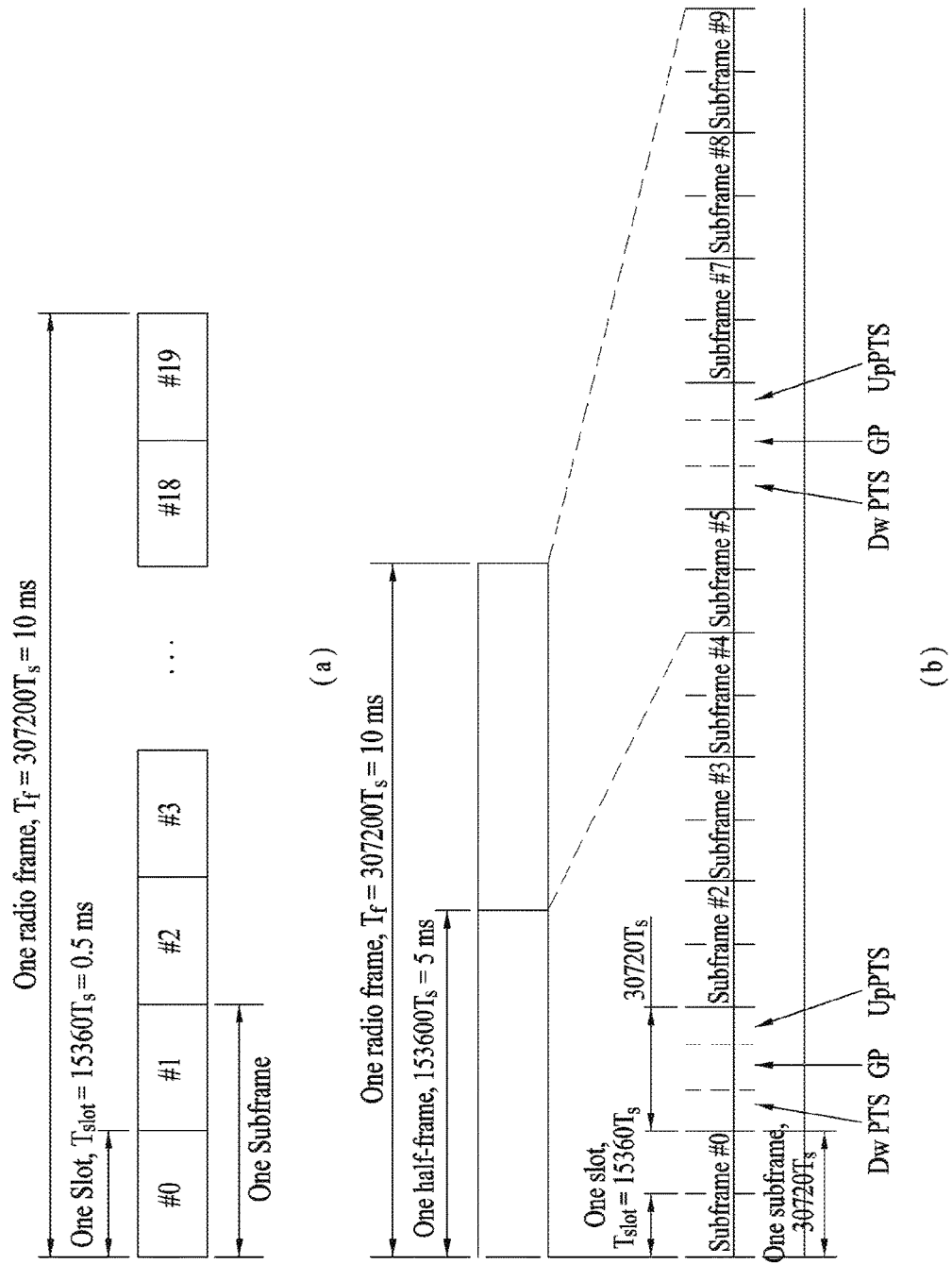
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e., single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g., a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/ downlink data. In addition, PUCCH (Physical Uplink Control Channel)/PUSCH (Physical Uplink Shared Channel)/ PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/ PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of uplink control information/ uplink data/random access signal through or on PUCCH/ PUSCH/PRACH. Furthermore, transmission of PDCCH/ PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/ LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
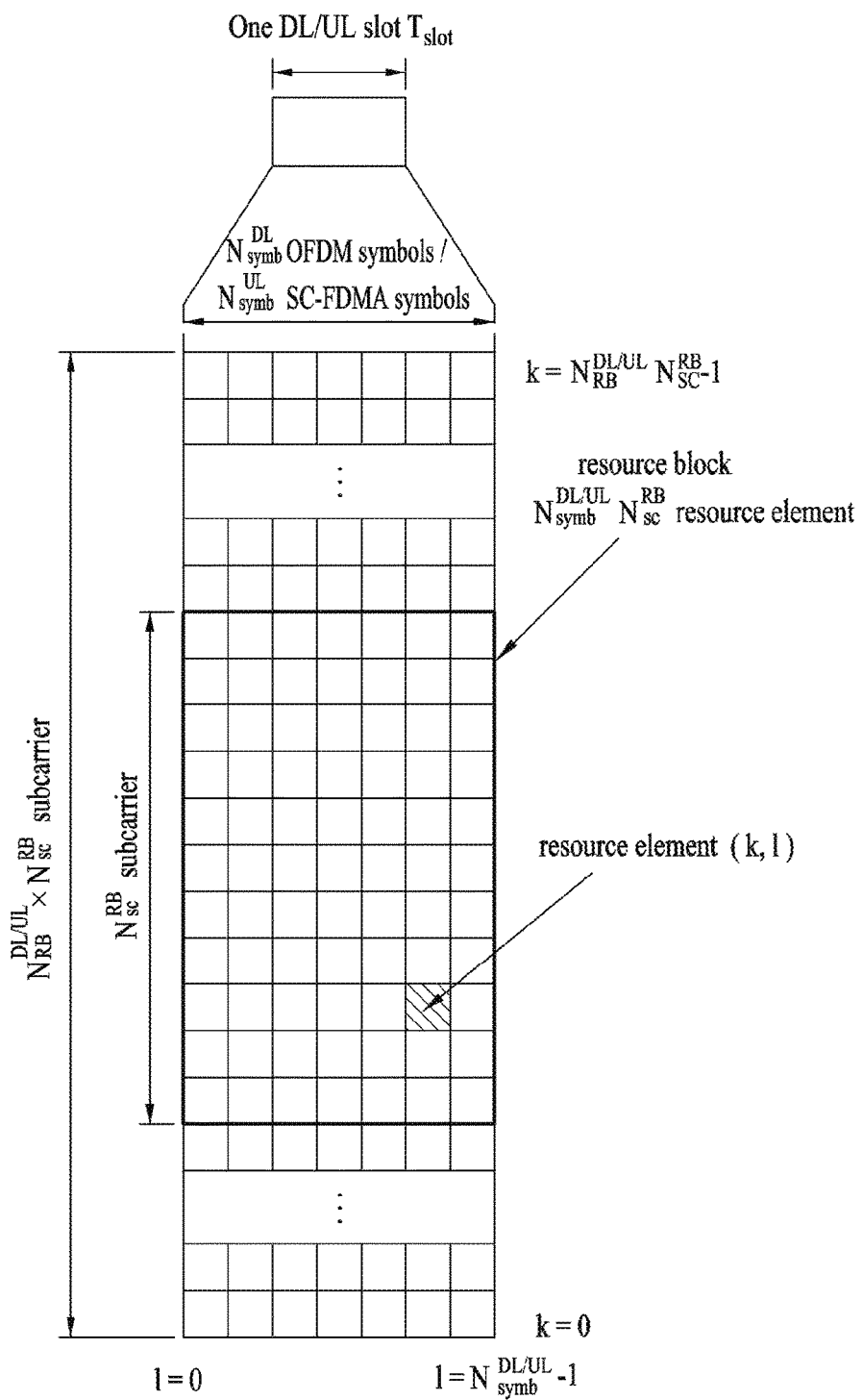
FIG. 2 illustrates an exemplary Downlink/Uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/ LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (F) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
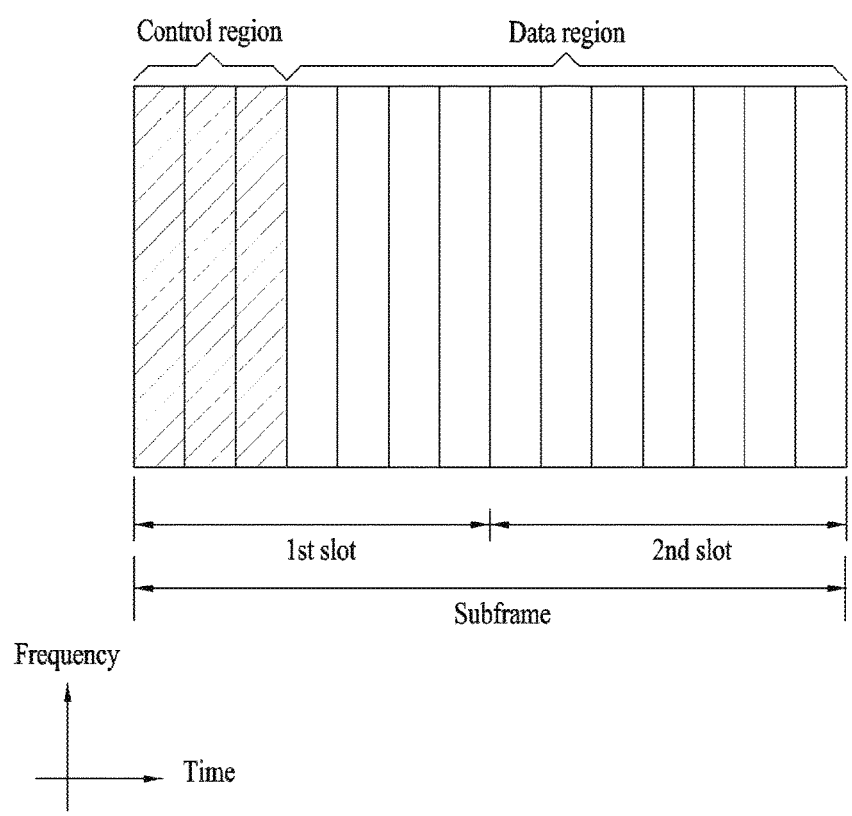
FIG. 3 illustrates an exemplary DL subframe structure in a 3$^{rd}$ Generation Partnership Project Long Term Evolution/Long Term Evolution-Advanced (3GPP LTE/LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
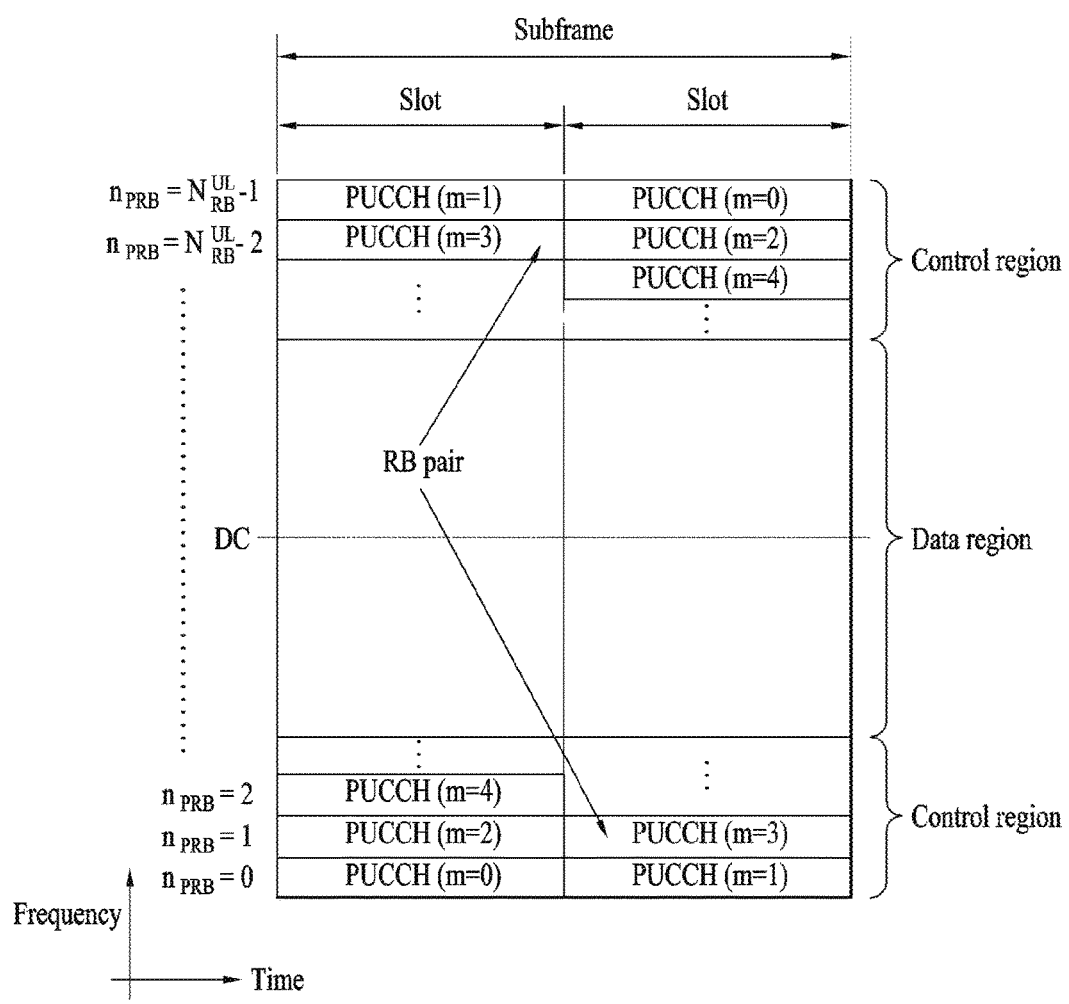
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A(exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

FIG. 5 shows the configuration of a wireless communication system including multiple antennas.

Figure 5A:
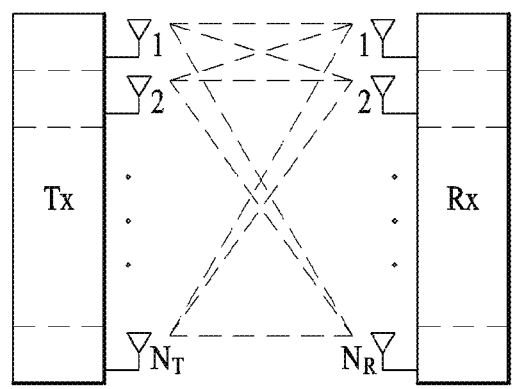
FIG. 5 is a block diagram of Multiple Input Multiple Output (MIMO) in the 3GPP LTE/LTE-A system.

As shown in FIG. 5(a), when both the number of transmit (Tx) antennas and the number of Rx antennas are increased respectively to $N_T$ and $N_R$, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \qquad \text{[Equation 1]}$$

For example, provided that a MIMO system uses four Tx antennas and four Rx antennas, the MIMO system can theoretically acquire a high transfer rate which is four times higher than that of a single antenna system.

Mathematical modeling of a communication method for use in the above-mentioned MIMO system will hereinafter be described in detail. It is assumed that there are $N_T$ Tx antennas and $N_R$ Rx antennas.

[95] In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T$$

Individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Also, $\hat{S}$ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

In the meantime, the information vector $\hat{S}$ having an adjusted transmission power is applied to a weight matrix W, so that $N_T$ transmission signals $x_1, x_2, \ldots, x_{N_T}$ to be actually transmitted are configured. In this case, the weight matrix W is adapted to properly distribute transmission information to individual antennas according to transmission channel situations. The above-mentioned transmission signals $x_1, x_2, \ldots, x_{N_T}$ can be represented by the following equation 5 using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

Here, $w_{ij}$ denotes a weight corresponding to i-th Tx antenna and j-th information. W represents a weight matrix or precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

Figure 5B:
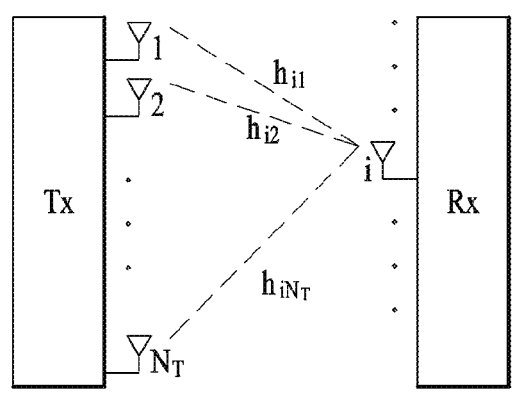

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix}$$

[Equation 8]

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

[Equation 10]

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R * N_T$.

In general, the rank of a matrix is defined as the smaller between the numbers of independent rows and columns. Accordingly, the rank of the matrix is not larger than the number of rows or columns. The rank of the matrix H, rank(H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

Codebook-based Precoding

In order to support multi-antenna transmission, precoding for properly distributing information to be transmitted to the respective antennas according to the channel conditions may be employed. The codebook-based precoding technique refers to a technique of predetermining a precoding matrix set in a transmit terminal and a receive terminal, causing the receive terminal to measure channel information from the transmit terminal and feed back, to the transmit terminal, an indication (i.e., a precoding matrix index (PMI)) indicating the most appropriate precoding matrix and causing the transmit terminal to apply appropriate precoding to signal transmission based on the PMI. According to this technique, since an appropriate precoding matrix is selected in the predetermined precoding matrix set, feedback overhead may be reduced compared to the case of explicitly feeding back optimum precoding information through channel information even if optimum precoding is not always applied.

Figure 6:
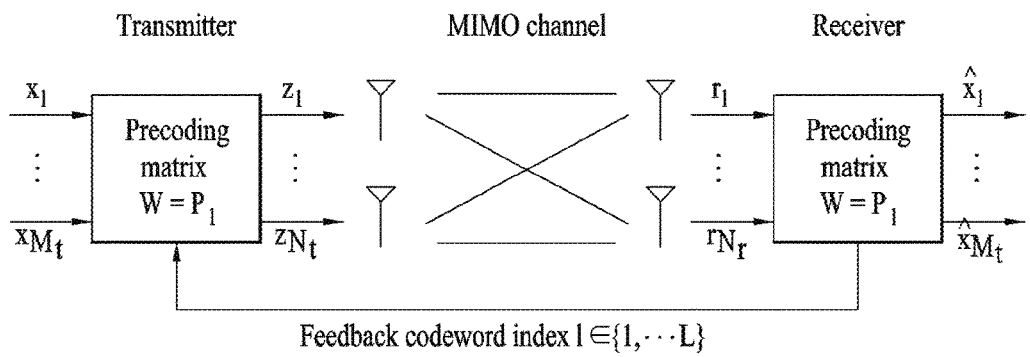
FIG. 6 illustrates codebook-based beamforming.

FIG. 6 illustrates the basic concept of codebook-based precoding.

According to the codebook-based precoding, the transmit terminal and receive terminal share codebook information including precoding matrices, the number of which is predetermined according to the transmission rank, the number of antennas, and the like. That is, the precoding-based codebook may be used if the feedback information is finite. The receive terminal may measure the channel state through a received signal, and feed back, to the transmit terminal, information about a finite number of preferred precoding matrices (namely, indexes of the corresponding precoding matrices). For example, the received terminal may measure the receive signal using the technique of maximum likelihood (ML) or minimum mean square error (MMSE), and select an optimum precoding matrix. While FIG. 6 illustrates that the receive terminal transmits, to the transmit terminal, precoding matrix information for respective codewords, embodiments of the present invention are not limited thereto.

Upon receiving feedback information from the receive terminal, the transmit terminal may select a specific precoding matrix in a codebook, based on the received information. Upon selecting the precoding matrix, the transmit terminal may perform precoding by multiplying layer signals, the number of which corresponds to a transmission rank by the selected precoding matrix, and transmit a transmit signal obtained through precoding via a plurality of antennas. The number of rows of the precoding matrix equals the number of antennas, and the number of columns of the precoding matrix equals the rank value. Since the rank value equals the number of layers, the number of columns of the precoding matrix equals the number of layers. For example, if the number of transmit antennas is 4, and the number of transmit layers is 2, the precoding matrix may be configured as a 4×2 matrix. Information transmitted through the respective layers using the precoding matrix may be mapped to the respective antennas.

Upon receiving the signal precoded and transmitted by the transmit terminal, the receive terminal may restore the received signal by performing reverse processing of the precoding performed by the transmit terminal. Typically, since a precoding matrix satisfies the criterion for a unitary matrix (U) such as $U*U^H=I$, the aforementioned reverse processing of the precoding may be implemented by multiplying the received signal by a Hermitian matrix $P^H$ for the precoding matrix P.

For example, Table 5 below shows a codebook used for downlink transmission using 2 transmit (Tx) antennas in 3GPP LTE Release-8/9, and Table 6 below shows a codebook used for downlink transmission using 4 Tx antennas in 3GPP LTE Release-8/9.

TABLE 5

| Codebook index | Number of rank 1 | Number of rank 2 |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 6

| Codebook index | $u_n$ | Number of layers v |  |  |  |
|---|---|---|---|---|---|
|  |  | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 6, $W_n^{\{s\}}$ is obtained with a set $\{s\}$ configured by an equation expressed as $W_n=I-2u_n u_n^H/u_n^H u_n$. Herein, I denotes a 4×4 single matrix, and $u_n$ has a value given in Table 6.

As shown in Table 5, a codebook for 2 Tx antennas has 7 precoding vectors/matrices. Herein, since the single matrix is intended for an open-loop system, the number of factors/matrices for precoding of a closed-loop system becomes 6. A codebook for 4 Tx antennas as shown in Table 6 has 64 precoding vectors/matrices.

The codebooks described above have common features such as a constant modulus (CM) property, a nested property, constrained alphabet and the like. According to the CM property, no element in the precoding matrices in a codebook includes '0', and the respective elements have the same size. The nested property means that a precoding matrix of a lower rank is designed to be configured as a subset of a specific column of a precoding matrix of a higher rank. The constrained alphabet means that the respective elements in all precoding matrices in a codebook are constrained. For example, the elements of a precoding matrix may be constrained to elements (±1) used for binary phase shift keying (BPSK), elements (±1,±j) used for quadrature phase shift keying (QPSK), or elements $$\left(\pm 1, \pm j, \pm \frac{(1+j)}{\sqrt{2}}, \pm \frac{(-1+j)}{\sqrt{2}}\right)$$

used for 8-PSK. In the example codebook of Table 6, since the alphabet of the respective elements of all precoding matrices in the codebook is configured by $$\left\{\pm 1, \pm j, \pm \frac{(1+j)}{\sqrt{2}}, \pm \frac{(-1+j)}{\sqrt{2}}\right\},$$

the codebook may be considered as having the constrained alphabet property.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 7

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 7, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH After Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 8

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2<br>RI<br>1st wideband CQI(4 bit)<br>2nd wideband CQI(4 bit)<br>if RI > 1<br>N*Subband PMI(4 bit)<br>(N is the total # of subbands)<br>(if 8Tx Ant, N*subband W2 + wideband W1) |
| | UE selected (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs) | | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit) |

TABLE 8-continued

| | PMI Feedback Type | | |
|---|---|---|---|
| | No PMI | Single PMI | Multiple PMIs |
| | Best-M index (L bit) | | Wideband PMI(4 bit) + Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes in Table 8 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 9

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

Figure 9:
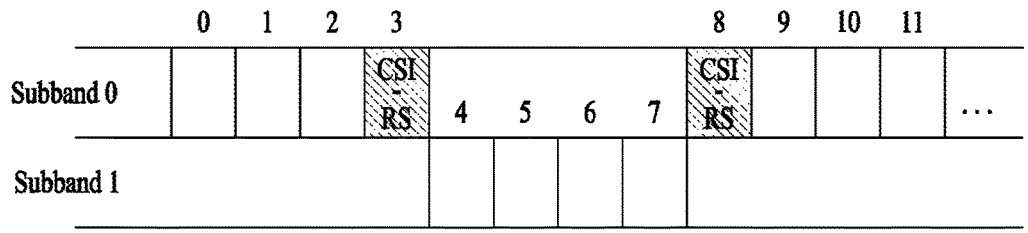
FIG. 9 illustrates a mismatch between a Channel State Information Reference Signal (CSI-RS) transmission period and a narrowband hopping period.

A UE may be set in transmission modes as shown in FIG. 9. Referring to FIG. 9, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

For a future-generation system such as LTE-A, it is under consideration to configure low-price/low-specification UEs focused on data communication such as metering, water level measurement, use of a surveillance camera, and reporting of a stock in a vender machine. Due to a small amount of transmission data and infrequent occurrences of DL/UL data transmission and reception, it is efficient to reduce the cost and battery consumption of such UEs adaptively to a low data rate. Accordingly, use of a maximum of 6 RBs for the UEs irrespective of a system bandwidth is considered, and thus the resulting performance degradation is expected. Particularly, such UEs may operate in a poor propagation environment (e.g., a basement or a warehouse). In this case, repetition or the like may be used to extend the coverage of the UEs. In the case where a coverage-improved UE is to increase a coverage level through repetition or the like, if the UE changes a band in which repetition occurs, with passage of time, the UE may reduce repeated transmissions through a diversity gain, thereby increasing performance and a battery consumption time. That is, the UE may perform subband hopping to achieve a diversity gain. If subband hopping is supported, the UE preferably performs the subband hopping in consideration of CSI measurement and feedback. The term "subband" in "subband hopping" is different in concept from "subband" related to a CSI report in the legacy LTE standards. Accordingly, the term "subband" will be replaced with "narrowband" in the present disclosure.

CSI Measurement and Reporting

In performing narrowband hopping, a UE receives/transmits data, while retuning between N (N>=1) narrowbands configured for the UE. Therefore, a CSI measurement/transmission method in the case of narrowband hopping of a UE should be defined. Further, the N narrowbands configured for the UE may be shared between cell-common data transmission and unicast transmission (including transmission of a control channel), or N1 and N2 (N1 and N2>=1) narrowbands may be separately allocated for cell-common data transmission and unicast transmission. The narrowband-hopping UE may measure/report CSI largely in two methods.

Method 1: CSI measurement and reporting for each narrowband.

Method 2: CSI measurement and reporting for total narrowbands (average narrowband).

Periodic Reporting

Mode 1-0 and Mode 1-1: wideband CSI

If Mode 1-0 or Mode 1-1 is used, a legacy UE measures/transmits a wideband CQI/PMI.

If Method 1 is used, a UE is not capable of perceiving a total system bandwidth in spite of a feedback mode for wideband CSI. Therefore, the UE transmits a wideband CSI feedback by calculating a CQI and PMI for a current operating bandwidth perceivable to the UE. In this case, the wideband may mean an entire narrowband (e.g., 6 RBs) that the UE may currently perceive. When calculating or reporting CSI, the UE may assume that its operating narrowband is not changed. That is, it may be possible for the UE to aggregate channel information irrespective of its narrowband hopping.

If Method 2 is used, the UE may calculate and report CSI for all measured channels of respective narrowbands (e.g., an average of measurements for all narrowbands), while performing hopping configured for the UE for wideband CSI. In this case, the wideband may refer to a set of hopping bands configured for the UE, instead of a system bandwidth. When calculating CSI for each narrowband, the UE may use a reference resource of each narrowband according to a necessary method. For example, the UE may uniformly use channels of the total narrowbands by using the latest available channel measurements one by one on a narrowband basis, or user a combination of other methods such as calculating CQIs by heavily weighting more recent narrowbands. Or if the UE uses more of a specific narrowband during narrowband hopping, the UE may differentiate reference resource use or measured channel use based on the use ratio of each narrowband.

Mode 2-0 and Mode 2-1: Subband CSI, UE Selected.

In Mode 2-0 and Mode 2-1, a legacy UE reports a subband index corresponding to a best CQI in a bandwidth part, and the CQI according to the legacy LTE standards.

According to an embodiment of the present disclosure, since a UE may neither report a plurality of subbands nor select a best CQI in Method 1, the meaning of Mode 2-0 and Mode 2-1 may be changed for a UE in an embodiment of the present disclosure. In the legacy LTE standards, two parameters, a subband size and a bandwidth part are given in Mode 2-0 and Mode 2-1. A narrowband-hopping UE may use each parameter as follows.

Subband size: the size of an operating band of the UE.

Bandwidth part: a list of narrowbands in which the UE performs narrowband hopping.

Therefore, if Mode 2-0 or Mode 2-1 is configured for the UE, the UE may measure and report a CQI for each narrowband under narrowband hopping, and transmit the index of a narrowband in which each CQI has been measured. The parameters may be transmitted to the UE by RRC signaling or the like.

Because the UE may measure only one narrowband at one time instant, a narrowband CQI/PMI measured at a CSI reporting time may be delayed information according to a hopping pattern. To minimize the time delay, the UE may report the CQI of a latest measured narrowband at a CSI reporting time. Or if the UE has prior knowledge of a hopping pattern, the UE may first report a CQI for a subband scheduled m msec later. For example, in the case where the UE is supposed to hop alternately between narrowband 0 and narrowband 1 every 5 msec, if the UE currently uses narrowband 1, the UE may give priority to a feedback for narrowband 1, since the UE is highly likely to use narrowband 1 again in consideration of the next feedback transmission time instant. In this case, CSI for the same narrowband may be reported continuously. To prevent continuous CSI reporting for the same narrowband, it may be configured that the narrowband is selected with a probability of p (p>0.5) and one of the other narrowbands is selected with a probability of 1−p. In the case of a delayed CSI feedback, it may be configured that a "freshness duration" is set and corresponding CSI is not reported after the duration, as in the following constraint.

According to the legacy LTE standards, subband sizes and the numbers of bandwidth parts are set for Mode 2-0 and Mode 2-1 of periodic CSI reporting, as follows.

TABLE 10

| System bandwidth $N^{DL}_{RB}$ | Subband size k (RBs) | Bandwidth part (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Figure 7:
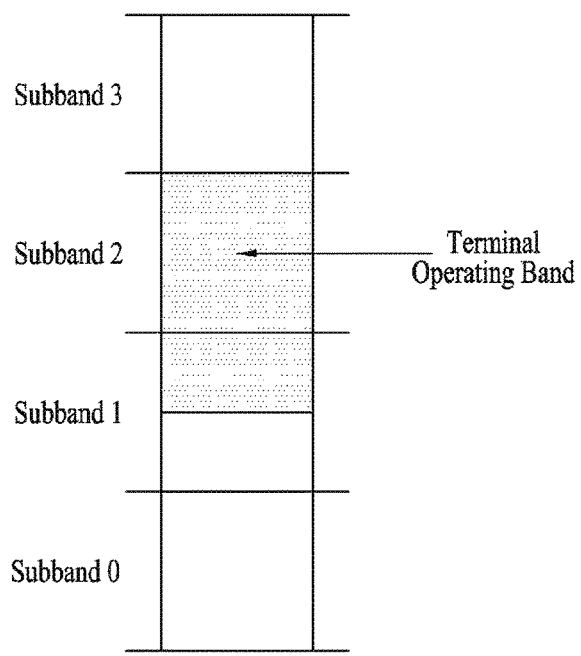
FIG. 7 illustrates a mismatch between a subband size and the size of a User Equipment (UE) operating band (a narrowband of the present disclosure)
Figure 8:
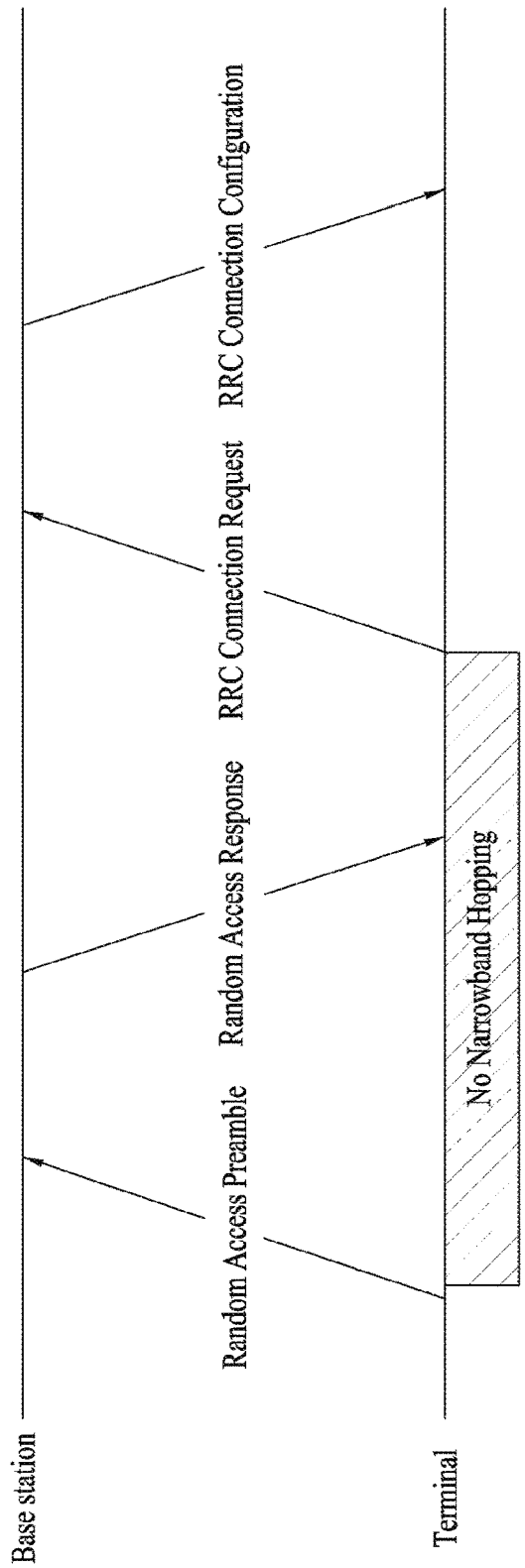
FIG. 8 illustrates a no narrowband hopping period according to an embodiment of the present disclosure.

However, if subbands are configured in the above manner, a problem occurs due to a constraint on a bandwidth available to a UE. FIG. 7 illustrates an example in which a subband size is 4 RBs and a bandwidth perceivable to a UE (i.e., the size of a UE operating band) is 6 RBs.

If an operating band is configured for a UE as illustrated in FIG. 7, the UE may measure subband 2, not subband 1. As such, the mismatch a bandwidth perceivable to the UE and a bandwidth that the UE is to measure may cause a problem. Thus, it may be assumed that the size k of a subband is an operating bandwidth R of the UE irrespective of a system bandwidth. Further, if the number of hopping narrowbands varies with a system bandwidth, the following example may be given.

TABLE 11

| System bandwidth $N^{DL}_{RB}$ | Subband size k (RBs) | Bandwidth part (J) |
|---|---|---|
| 6-11 | NA | NA |
| 12-15 | 6 | 2 |
| 16-39 | 6 | 3 |
| 40-63 | 6 | 4 |
| 64-110 | 6 | 5 |

The above table is made for R=6 RBs, by way of example.

Since the eNB may estimate a narrowband for which CSI has been measured according to the transmission/reception timing of the CSI, the eNB may disable transmission of a subband index from the UE, when needed. Enable/disable of narrowband index transmission may be indicated by RRC signaling.

The same configuration as in Method 1 may be used in Method 2. In this case, however, channel information may be calculated and reported for a narrowband group including two or more narrowbands, instead of a total narrowband list. The narrowband group may be predefined or indicated by RRC signaling. The narrowband group may be indicated by indexes in a hopping narrowband list or narrowband indexes in total system narrowbands. If a narrowband index indicated to a UE does not exist in a narrowband list for the UE, a CSI report for a narrowband corresponding to the narrowband index may be ignored.

Aperiodic Reporting

As in periodic reporting, a mismatch between a bandwidth perceivable to a UE and a bandwidth that the UE is to measure may occur in aperiodic reporting. In aperiodic reporting, the subband size k may also be fixed to R RBs (e.g., 6 RBs) irrespective of the system bandwidth.

Mode 3-0 and Mode 3-1

In Mode 3-0 or Mode 3-1, the UE measures/transmits a CQI/PMI for every individual narrowband.

If Method 1 is used, the UE is not capable of perceiving all narrowbands in one reference subframe and thus may not perform a corresponding operation in legacy LTE. Therefore, multiple reference subframes may be defined for the UE. In this case, the UE calculates and reports CSI by taking channel information measured in subframes satisfying the following four conditions.

i. A subframe carrying an aperiodic CSI request or a subframe pervious to the subframe.
  ii. A valid DL subframe.
  iii. The latest of subframes in which channel information about narrowbands included in a hopping narrowband list may be measured.
  iv. A subframe within an expiration time.

A valid DL subframe described in condition ii is defined in the legacy LTE standards as follows.

A DL subframe in a serving cell shall be considered to be valid if:
  it is configured as a DL subframe for that UE, and
  except for transmission mode 9 or 10, it is not an MBSFN subframe, and
  it does not contain a DwPTS field in case the length of DwPTS is 7680 Ts and less, and
  it does not fall within a configured measurement gap for that UE, and
  for periodic CSI reporting, it is an element of the CSI subframe set linked to the periodic CSI report when that UE is configured with CSI subframe sets.

(A downlink subframe in a serving cell shall be considered to be valid if:
  it is configured as a downlink subframe for that UE, and
  except for transmission mode 9 or 10, it is not an MBSFN subframe, and
  it does not contain a DwPTS field in case the length of DwPTS is 7680?T and less, and
  it does not fall within a configured measurement gap for that UE, and
  for periodic CSI reporting, it is an element of the CSI subframe set linked to the periodic CSI report when that UE is configured with CSI subframe sets.)

Further, the valid DL subframe may be affected by the number of narrowband hoppings in addition to the legacy LTE definition. For example, if a specific narrowband appears fewer than a predetermined number of times for a predetermined time period, a channel of the specific narrowband may be excluded in measurement. The eNB may indicate a narrowband expiration time/occurrence frequency by RRC signaling.

An expiration time described in condition iv is a valid time duration of channel information measured in each narrowband. Measured channel information for which the expiration time has elapsed may not be used as a reference resource. The UE may measure and preserve the expiration time or receive information about the expiration time from the eNB by RRC signaling. In addition, one expiration time may be set for total narrowbands, or may be set or measured independently for each narrowband.

In the above-described method, the UE may transmit CSI measured in each narrowband, one by one.

If the UE performs measurement not for the hopping narrowband list but for the total narrowbands, a corresponding aperiodic CSI request may also trigger an operation for measurement in the total narrowbands. For example, the UE may measure and report channel information about all narrowbands, while retuning to the lowest subband and sequentially shifting to higher narrowbands.

If Method 2 is used, the same operation as in Method 1 may be performed, except that a composite CQI/PMI for two or more narrowbands or the total narrow bands is calculated and reported. In this case, the number of narrowbands to be integrated or a narrowband subset in a hopping narrowband list may be indicated directly to the UE and that by RRC signaling.

Mode 2-0 and Mode 2-2

If Mode 2-0 or Mode 2-2 is sued, the UE selects M narrowbands from a configured narrowband list, reports the indexes of the selected narrowbands, and transmits an average CQI for the case where all of the M narrowbands are used.

If Method 1 is used, the UE may transmit a CQI measured in each narrow band. Or the UE may perform measurement in a narrowband subset in the configured hopping narrowband list. In this case, the target narrowband list may be indicated by RRC signaling or predefined.

If Method 2 is used, the UE may transmit an average CQI for the whole configured hopping narrowband list.

If narrowband hopping is used, an operating narrowband is periodically shifted. Therefore, a reference subframe for CSI calculation before a hopping time is on a channel of a different narrowband and thus may not be used for CSI calculation. Accordingly, it is preferable to consider a reference subframe before a narrowband hopping time to be unavailable.

Further, a parameter for setting Method 1 or Method 2 may be transmitted by RRC signaling. Or Method 1 or Method 2 may be defined for each feedback mode, and thus one of Method 1 and Method 2 may be indicated by selecting a feedback mode. For example, periodic feedback modes 1-0 and 1-1 may be configured to use Method 2, and periodic feedback modes 2-0 and 2-1 may be configured to use Method 1.

CSI-RS Configuration for Narrowband-Hopping UE

For a UE that performs narrowband hopping, the following CSI-RS configurations may be set.

Method 1: CSI-RS configuration for each narrowband
  If Method 1 is used for CSI reporting on a narrowband basis, a different CSI-RS configuration may be enabled depending on which narrowband the UE operates in.
  If Method 1 is used for CSI reporting for total narrow bands, a relationship between CSI-RS configurations defined for the respective narrowbands (e.g., a narrowband hopping order, an averaging method, and a hopping gap) may be defined additionally. The corresponding information may be included in a CSI-RS configuration or transmitted to the UE by RRC signaling or the like. Or it may be assumed that CSI-RS transmission resources are determined according to the hopping sequence/pattern of a corresponding narrowband.

Method 2: CSI-RS configuration for total narrowbands
  If Method 2 is used for CSI reporting of the UE for total narrow bands, a time window for which averaging may or should be performed may be indicated in a CSI-RS configuration. Alternatively, the number of hopping narrowbands may be indicated, instead of the time window for averaging.

Method 3: no CSI-RS configuration (CRS measurement)
  If an MTC UE using narrowband hopping measures and reports CSI using CRSs, there is no need for a CSI-RS configuration. In this case, therefore, information such as a hopping order, an averaging method, a hopping gap, or a time window for averaging (or a reference subframe) should be transmitted separately to the UE by RRC signaling or the like.

If Method 2 or Method 3 is used for a CSI-RS configuration, the following may be additionally considered.
  If CSI processes for two narrowbands are configured for the UE, the network may configure CSI set 0 and CSI set 1 according to a hopping pattern. The network may link each CSI set to a narrowband, and it is proposed that measurement is performed only in a narrowband linked to a subframe configured on a CSI set basis. It is assumed that a CSI set for each narrowband may be configured according to a hopping pattern. That is, the UE assumes that it may monitor/measure a narrowband linked to a corresponding CSI set without additional narrowband hopping. Otherwise, for example, if the UE should hop to another frequency and read common data, the UE may not perform measurement in a corresponding subframe. If this case occurs and thus measurement performance is degraded, the UE may skip transmission of a feedback. Or the UE may report Out of Range (OOR) in this situation. Additionally, a narrowband CSI set may be configured on the assumption of unicast transmission to the UE. Accordingly, if the UE reads cell-common data or does not monitor a narrowband configured for unicast transmission, the UE may not perform CSI measurement.

For example, if the UE hops between two subbands, the eNB may set two CSI-RS configurations for the UE in Method 1 and one CSI-RS configuration for the UE in Method 2.

Hopping Narrowband List

A list of narrowbands between which the UE hops may be transmitted to the UE in the following methods.

Method 1: a hopping narrowband list may be transmitted by RRC signaling.

More specifically, the UE may use a narrowband CSI set S configured by higher-layer signaling. In this case, it may be assumed that narrowbands are preconfigured, and the network may configure narrowbands for which a feedback is to be received in the set S.

Method 2: a hopping narrowband list may be transmitted in a CSI-RS configuration.

A narrowband to which each CSI-RS configuration is applied is indicated in a CSI-RS configuration set on a narrowband basis, and this may serve as a hopping narrowband list.

In regards to a CSI-RS configuration for the total narrowbands, a hopping narrowband list may be included in the CSI-RS configuration.

Method 3: a hopping narrowband list may be transmitted in DCI.

Narrowband Hopping Pattern

A narrowband hopping pattern may be indicated to the UE in the following methods. The UE may determine to which narrowband it is to hop at which timing, using a hopping pattern based on this hopping narrowband list. Thus, the UE may enable or disable a CSI-RS configuration.

Method 1: a narrowband hopping pattern to be used by the UE may be indicated by RRC signaling.

In this case, the UE may continue to use a specific hopping pattern until before receiving a new RRC configuration, without hopping during RRC reconfiguration.

Method 1-1: a narrowband hopping pattern to be used by the UE may be indicated by RRC signaling and enabling or disabling of the narrowband hopping pattern may be indicated by DCI. The narrowband hopping pattern indicated by RRC signaling may be enabled or disabled by a 1-bit field of DCI. In this case, the UE may feed back CSI for a subframe following an enabled or disabled subframe, as a reference resource, without feeding back previous CSI. If hopping is disabled, the UE may report the latest CSI measured in a narrowband for which the UE is currently supposed to report CSI, instead of an average CSI.

Method 1-2: k (k>1) narrowband hopping patterns may be indicated by RRC signaling, and a narrowband hopping pattern to be used by the UE may be indicated by a specific field of DCI. The other operations are performed in the same manner as in Method 1-1.

Method 2: a narrowband hopping pattern to be used by the UE may be included in a CSI-RS configuration.

If a CSI-RS configuration is used on a narrowband basis, each CSI-RS configuration may be numbered and thus hopping may be performed to a narrowband indicated by each numbered CSI-RS configuration.

If a CSI-RS configuration for total narrowbands is used, the sequence of narrowbands between which the UE is to hop may be included.

Maximum Number of Hopping Narrowbands

For CSI averaging, the UE should store previously measured channel information. Particularly, the UE preferably stores a measurement of at least one channel for each narrowband. However, since the UE's capacity or the UE's memory for another operation may lack, the maximum number/duration of CSI measurements that the UE should store may be limited to or below a predetermined value by limiting the number of narrowbands available for hopping of the UE.

For this purpose, the maximum number of narrowbands available for hopping of the UE may be indicated by RRC signaling or the like. In this case, even though the UE receives more hopping narrowband configurations than the maximum number, the UE may use as many narrowbands as indicated for hopping.

Method 1: fixed maximum number of hopping narrowbands

The maximum number of hopping narrowbands configurable for the UE may be limited. The maximum number of hopping narrowbands may be determined by the category, capabilities, and so on of the UE. Further, the eNB may receive information about the maximum number of hopping narrowbands of the UE from the UE, and may use the received information in configuring hopping narrowbands for the UE.

Method 1-1; maximum number of hopping narrowbands determined in consideration of UE capabilities Although Method 1-1 is similar to Method 1, the maximum number of hopping narrowbands may be derived according to a specific capability such as the server size of the UE or the like.

In this case, if the number of configured hopping narrowbands exceeds the maximum number of hopping narrowbands, a narrowband to be used for hopping of the UE may be defined.

No Hopping for Random Access Response (RAR) Transmission

The eNB may transmit an aperiodic CSI request to the UE on a Random Access Channel (RACH) in some cases. For this purpose, the UE may measure/calculate CSI, while awaiting reception of an RAR after transmitting a Random Access (RA) preamble. For this purpose, the eNB may prohibit narrowband hopping/retuning during a corresponding time period, and the UE may assume that there is no narrowband hopping/retuning operation during the corresponding time period.

Or, if the number of narrowbands carrying an RAR is limited, the UE may measure CSI in the narrowbands.

Further, the UE may store channel information measured for the purpose of averaging CSI. The eNB may indicate a CSI validity duration to the UE by RRC signaling or the like, and the UE may store the measured channel information during the CSI validity duration. For example, if the eNB indicates a CSI validity duration of 100 ms to the UE, the UE may discard channel information measured 100 ms ago without using it.

In addition, it is preferable to set a hopping period for narrowband hopping to an integer multiple of a CSI-RS transmission period. For example, as illustrated in FIG. 9, a case in which a CSI-RS transmission period is 5 subframes and a hopping period is set to 4 subframes may be considered. In this case, the eNB switches between narrowband 0 and narrowband 1 to be transmitted to the UE, every four subframes. Since there is no CSI-RS that the UE is to measure in subband 1, the UE is not capable of measuring or calculating CSI normally. Therefore, the same number of CSI-RSs should be transmitted to the UE at each narrowband hopping timing by setting a hopping period to an n multiple of a CSI-RS transmission period (n is a positive integer).

Figure 10:
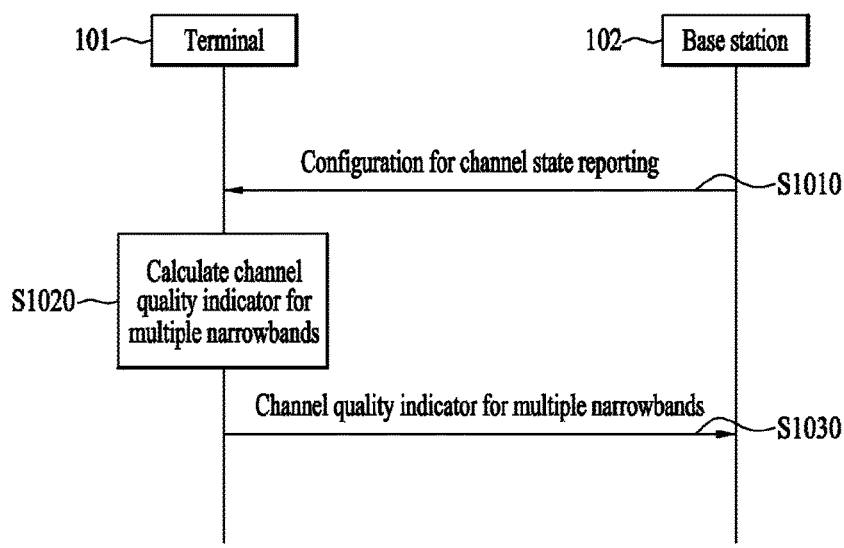
FIG. 10 illustrates an operation according to an embodiment of the present disclosure.

FIG. 10 illustrates an operation according to an embodiment of the present disclosure.

FIG. 10 depicts a method for reporting a channel state in a wireless communication system. The terminal may receive data, while retuning between a plurality of narrowbands.

The terminal may receive a configuration for channel state reporting (1010).

When a periodic wideband feedback mode is configured according to the channel state reporting configuration, the terminal may calculate a CQI for all the narrowbands (S1020).

The terminal may report the calculated CQI (S1030).

In calculating the CQI, the terminal may perform channel measurement in a reference resource configured for channel state reporting in each of the narrowbands.

In addition, the terminal may uniformly use the result of channel measurement in each of the narrowbands in order to calculate the CQI. The terminal may apply different weights to the channel measurements of the narrowbands in calculating the CQI.

In addition, the periodic wideband feedback mode is Mode 1-0 or 1-1.

When a periodic subband feedback mode is configured according to the channel state reporting configuration, the terminal may report the best of CQIs for the respective narrowbands. The size of the plurality of narrowbands may be fixed irrespective of a system bandwidth.

Or, when a periodic subband feedback mode is set according to the channel state reporting configuration, the terminal may report a CQI for a narrowband group including two or more narrowbands. The narrowband group may be pre-defined or indicated by a higher-layer signal.

When at least part of the narrowband group is not included in the plurality of narrowbands, the terminal may ignore reporting a CQI for a specific narrowband of the narrowband group, which is not included in the plurality of narrowbands.

The CQI for the total narrowbands may be calculated using a CRS.

In addition, the terminal may receive a CSI-RS configuration for channel state reporting. The CSI-RS configuration may be for the total narrowbands, and a CSI-RS transmission period may be set to an integer multiple of a retuning period between the plurality of narrowbands.

While the embodiments of the present disclosure have been described briefly above with reference to FIG. 10, the embodiment related to FIG. 10 may include at least a part of the afore-described embodiment(s), alternatively or additionally.

Figure 11:
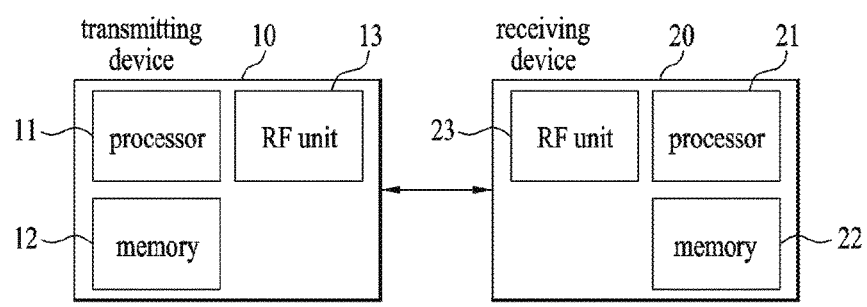
FIG. 11 is a block diagram of apparatuses for implementing an embodiment(s) of the present disclosure.

FIG. 11 is a block diagram illustrating a transmitter 10 and a receiver 20 configured to implement embodiments of the present invention. Each of the transmitter 10 and receiver 20 includes a radio frequency (RF) unit 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the RF unit 13, 23 and the memory 12, 22 to control the memory 12, 22 and/or the RF unit 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitter or the receiver. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the RF unit 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiver in the form of one or more layers. To perform frequency-up transformation, the RF unit 13 may include an oscillator. The RF unit 13 may include Nt transmit antennas (wherein Nt is a positive integer greater than or equal to 1).

The signal processing procedure in the receiver 20 is configured as a reverse procedure of the signal processing procedure in the transmitter 10. The RF unit 23 of the receiver 20 receives a radio signal transmitted from the transmitter 10 under control of the processor 21. The RF unit 23 may include Nr receive antennas, and retrieves baseband signals by frequency down-converting the signals received through the receive antennas. The RF unit 23 may include an oscillator to perform frequency down-converting. The processor 21 may perform decoding and demodulation on the radio signal received through the receive antennas, thereby retrieving data that the transmitter 10 has originally intended to transmit.

The RF unit 13, 23 includes one or more antennas. According to an embodiment of the present invention, the antennas function to transmit signals processed by the RF unit 13, 23 are to receive radio signals and deliver the same to the RF unit 13, 23. The antennas are also called antenna ports. Each antenna may correspond to one physical antenna or be configured by a combination of two or more physical antenna elements. A signal transmitted through each antenna cannot be decomposed by the receiver 20 anymore. A reference signal (RS) transmitted in accordance with a corresponding antenna defines an antenna from the perspective of the receiver 20, enables the receiver 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An RF unit supporting the Multiple-Input Multiple-Output (MIMO) for transmitting and receiving data using a plurality of antennas may be connected to two or more antennas.

In embodiments of the present invention, the UE operates as the transmitter 10 on uplink, and operates as the receiver 20 on downlink. In embodiments of the present invention, the eNB operates as the receiver 20 on uplink, and operates as the transmitter 10 on downlink.

The transmitter and/or receiver may be implemented by one or more embodiments of the present invention among the embodiments described above.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention is applicable to wireless communication devices such as a terminal, a relay, and a base station.

The invention claimed is:

1. A method for reporting a channel state by a terminal operating on one of a plurality of narrowbands in a wireless communication system, the method comprising:
   receiving, by the terminal, a configuration for channel state reporting;
   calculating, by the terminal, a first channel quality indicator (CQI) for all of the plurality of narrowbands, when the configuration indicates that a periodic wideband feedback mode is configured for the terminal;
   reporting, by the terminal, the calculated first CQI; and
   reporting a second COI for a narrowband group including two or more narrowbands among the plurality of narrowbands, when the configuration indicates that a subband feedback mode is configured for the terminal,
   wherein the narrowband group is predefined or indicated by higher-layer signaling, and
   wherein, when at least a part of the narrowband group is not included in the plurality of narrowbands, a CQI for a narrowband of the narrowband group, not included in the plurality of narrowbands, is ignored at reporting the second CQI.

2. The method according to claim 1, wherein the calculating the first CQI includes performing a channel measurement in a reference resource configured for channel state reporting in each of the plurality of narrowbands.

3. The method according to claim 2, further comprising uniformly using a result of the channel measurement performed in each of the plurality of narrowbands to calculate the first CQI.

4. The method according to claim 2, further comprising using a result of the channel measurement performed in each of the plurality of narrowbands by applying different weights to results of channel measurement to calculate the first CQI.

5. The method according to claim 1, wherein the periodic wideband feedback mode is Mode 1-0 or Mode 1-1.

6. The method according to claim 1, wherein the first CQI for all of the plurality of narrowbands is calculated using a cell-specific reference signal (CRS).

7. The method according to claim 1, further comprising:
   receiving a channel state information-reference signal (CSI-RS) configuration for the channel state reporting,
   wherein the CSI-RS configuration is for all of the plurality of narrowbands, and a CSI-RS transmission period is set to an integer multiple of a retuning period between the plurality of narrowbands.

8. A terminal for reporting a channel state in a wireless communication system, the terminal comprising:
   a radio frequency (RF) unit operating on one of a plurality of narrowbands; and
   a processor configured to control the RF unit,
   wherein the processor is configured to:
   receive a configuration for channel state reporting,
   calculate a first channel quality indicator (CQI) for all of the plurality of narrowbands when the configuration indicates that a periodic wideband feedback mode is configured for the terminal,
   report the calculated first CQI, and
   report a second CQI for a narrowband group including two or more narrowbands among the plurality of narrowbands, when the configuration indicates that a subband feedback mode is configured for the terminal,
   wherein the narrowband group is predefined or indicated by higher-layer signaling, and
   wherein, when at least a part of the narrowband group is not included in the plurality of narrowbands, a CQI for a narrowband of the narrowband group, not included in the plurality of narrowbands, is ignored by the processor at reporting the second CQI.

* * * * *